Nov. 19, 1946.                C. E. MILLER ET AL                2,411,450
                        MATERIAL TESTING APPARATUS
                           Filed July 28, 1944
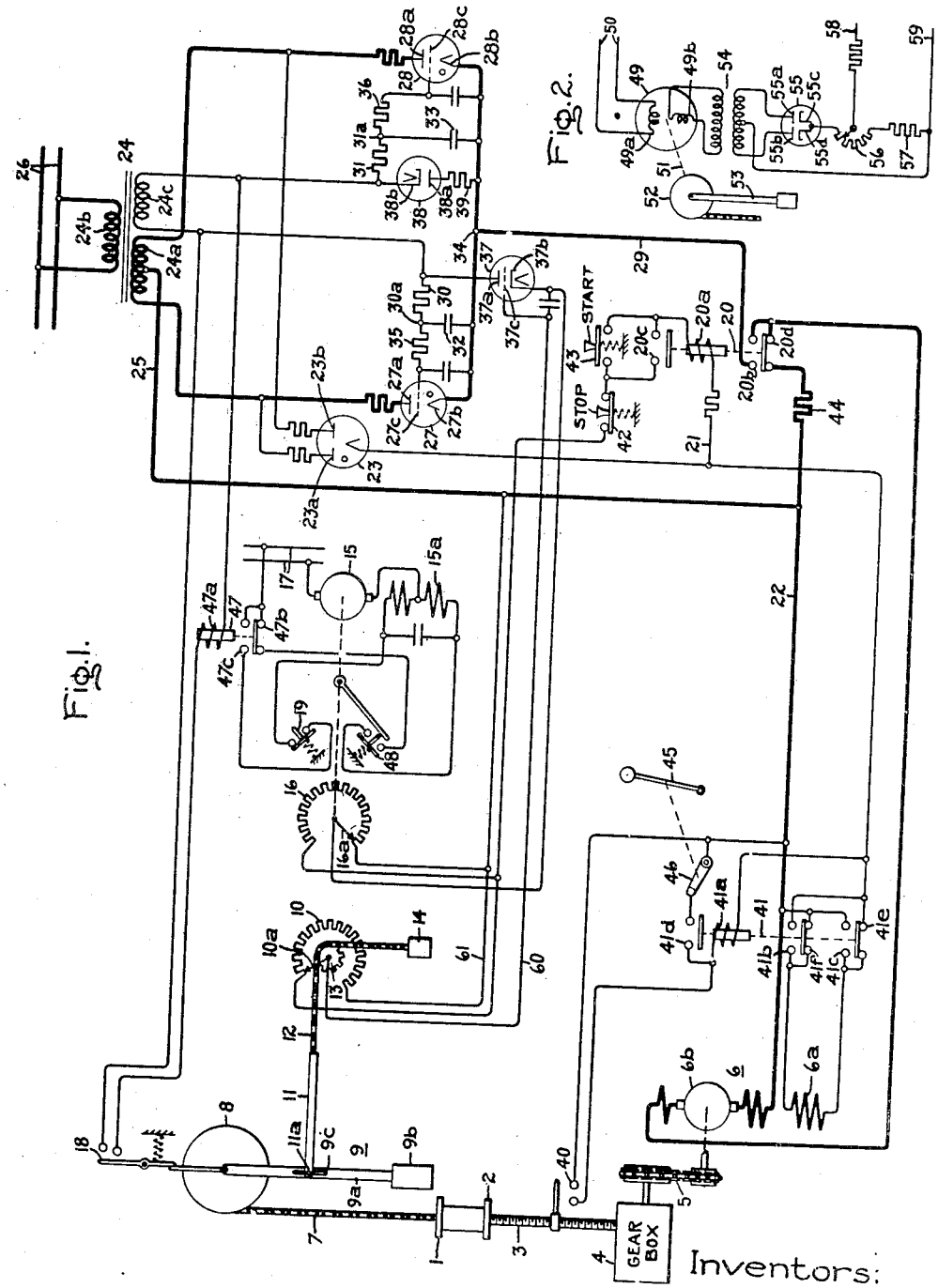
Inventors:
Charles E. Miller,
Robert J. Demartini,
by Harry E. Dunham
Their Attorney.

Patented Nov. 19, 1946

2,411,450

UNITED STATES PATENT OFFICE 2,411,450

MATERIAL TESTING APPARATUS

Charles E. Miller, Scotia, and Robert J. Demartini, Schenectady, N. Y., assignors to General Electric Company, a corporation of New York Application July 28, 1944, Serial No. 547,071

16 Claims. (Cl. 73—90)

This invention relates to the testing of materials, more particularly to apparatus for testing material samples, and it has for an object the provision of a simple, reliable, inexpensive, and improved apparatus of this character.

In the testing of many materials such as textile fabrics, the apparent strength of the material as determined by a testing machine varies materially with variations in the rate at which load is applied to the test sample. The rate of application of load to the material sample, in turn, depends upon the elasticity or "stretchiness" of the material sample. Consequently, markedly different indications of tensile strength are obtained from material samples having the same actual tensile strength but having different elasticities. Accordingly, a further object of this invention is the provision of means for controlling a testing machine in such a manner that the rate of application of load to the test sample is independent of the elasticity of the material and therefore reproducible from sample to sample.

Another object of the invention is the provision of means for controlling the testing machine in such a manner that the application of load is substantially uniform for all materials irrespective of their elasticity.

A still further object of the invention is the provision of apparatus of the character described in the foregoing in which the initial rate at which load is imposed on the same is low so that substantially all possibility of shock is eliminated.

In carrying the invention into effect in one form thereof, a testing machine is utilized which has a pair of members for holding the test sample. One of these members is driven by an electric motor in a direction to apply a force to the sample. Means are provided for producing a variable reference speed of which the rate of variation is substantially constant. Additional means are provided for producing a signal voltage which is proportional to the load on the material sample. The difference between the two voltages is utilized to control the motor which drives the testing machine to equalize the rate at which the load is being applied to the sample with the rate of variation of the reference voltage. In one specific embodiment of the invention, a movable member is driven at a constant speed by a synchronous motor, and another movable member is driven at a speed having a predetermined relationship to the rate at which load is being applied to the test sample.

Means are provided for producing a control voltage which varies in accordance with the difference in speeds of the two members. This control voltage is utilized to control suitable electric valve apparatus to control the supply of current to the motor which drives the testing machine to equalize the speeds of the two members. In another embodiment, means are provided for producing a variable reference voltage. An induction voltage regulator produces a signal voltage which is proportional to the load, and the difference of the two voltages is utilized to control the motor to equalize the two voltages and thereby effect application of load to the test sample at a substantially constant rate.

For a better and more complete understanding of the invention, reference should now be had to the following specification and to the accompanying drawing of which Fig. 1 is a simple, diagrammatical sketch of an embodiment of the invention and Fig. 2 is a modification.

Referring now to the drawing, a material testing machine is illustrated as being provided with two members 1 and 2 for holding a sample of the material which is to be tested for tensile strength. Each of the members 1 and 2 may be a conventional pair of jaws for securely gripping the sample. The lower pair of jaws 2 is mounted on a screw 3 which is in threaded engagement with a nut (not shown) within the gear box 4. The nut is connected through a gear train and a chain and sprocket drive 5 to the shaft of an electric motor 6. Although the motor 6 may be of any suitable type, it is illustrated as a separately excited D.-C. motor.

The upper pair of jaws 1 is connected through a chain 7 to a drum 8 which is rotatably mounted on the frame of the machine. Secured to the drum is a pendulum 9 comprising an arm 9a having a weight 9b on the free end.

In order to cause the load to be applied to the test sample at a uniform rate, suitable means are provided for comparing the rate of application of load to the test sample with a constant reference speed, and utilizing the difference to control the speed of the motor 6.

For the purpose of providing an indication of the rate of application of load to the test sample, the slider 10a of a potentiometer 10 is mechanically connected to the pendulum 9 by means of a rod 11, a chain 12, and a sprocket 13. One end of the rod 11 is provided with a pin 11a which slides in a slot 9c in the pendulum arm. The opposite end of the rod is connected to the chain 12 which engages the sprocket 13 and, at its lower end, is provided with a weight 14. Thus, whenever the rod 11 moves as a result of the counterclockwise rotation of the pendulum 9, the potentiometer slider 10a is rotated at a speed proportional to the speed of the rod 11.

The load on the test sample varies with the angular position of the pendulum. Since the weight of the pendulum remains constant, the load on the sample varies with the length of the moment arm of the weight 9b about the center of the drum 8. Owing to the slotted connection of the rod 11 with the pendulum, the position of the rod 11 varies in a lengthwise direction approximately in proportion to the changing length of the moment arm of weight 9b. Thus, the position of the rod 11 is an approximate measure of the load on the sample, and the speed of the lengthwise movement of the rod is a measure of the rate of application of load to the test sample. Since the speed of the potentiometer slider 10a is proportional to the lengthwise speed of the rod 11, it is also proportional to the rate of application of load to the test sample.

The reference speed with which the rate of application of load to the sample is compared, is provided by means of a synchronous motor 15 which drives the slider 16a of a potentiometer 16 at constant speed. The synchronous motor 15 is preferably of the single-phase, self-starting type, i. e., the motor starts immediately when it is connected to a single-phase source such as represented by the supply line 17.

A limit switch 18 actuated by the pendulum near the beginning of its counterclockwise rotation serves to connect the synchronous motor 15 to the source 17, and a limit switch 19 which is actuated by the synchronous motor itself serves to interrupt the connections of the synchronous motor to the source after a predetermined amount of rotation, thereby to prevent the slider 16a from being driven past its end position.

The resistors of the potentiometers 10 and 16 are connected in parallel with each other and in series with the operating coil 20a of a line contactor 20 across the control voltage buses 21 and 22. A substantially constant direct voltage is supplied to the control voltage buses 21 and 22 by means of suitable rectifying means which is illustrated as a double diode electric valve 23 of which the anodes 23a and 23b are connected to opposite terminals of the secondary winding 24a of the supply transformer 24, and the cathode is connected to the bus 21. The bus 22 is connected by means of a conductor 25 to the center tap of the secondary winding 24a of the supply transformer. The primary winding 24b of supply transformer 24 is connected to a suitable source of alternating voltage such as represented by the two supply lines 26. As thus connected, the valve 23 operates as a full wave rectifier to supply a rectified voltage to the buses 21 and 22. As shown, the separately excited field winding 6a of the motor 6 is connected across the buses 21 and 22.

The armature 6b of the motor 6 is supplied from suitable electric valve means illustrated as a pair of thyratrons 27 and 28. The anodes 27a and 28a of these thyratrons are connected to opposite terminals of the supply transformer secondary winding 24a, and the cathodes 27b and 28b are connected through conductor 29 and the main contacts 20b of contactor 20 to one terminal of the motor armature 6b. The other terminal of the armature is connected to bus 22 which, as pointed out in the foregoing, is connected to the center tap of the secondary winding 24a. As thus connected, the thyratrons 27 and 28 rectify both half-waves of the alternating voltage and supply the rectified voltage to the armature 6b.

The speed of the motor 6 is adjusted by varying the average current conducted by the thyratrons. Although the thyratrons may be controlled by any suitable method, it is preferred to use the method of phase shift control of the grid voltage. For the carrying out of this method of control, a phase shifting resistance-reactance network is provided. This network comprises a secondary winding 24c of the transformer 24, resistors 30 and 31, and capacitors 32 and 33. The resistors and capacitors are connected in series relationship across the secondary winding 24c. The circuit is traced from the left-hand terminal of the secondary winding 24c through resistor 30, capacitor 32, the common cathode connection 34, capacitor 33, and resistor 31 to the opposite terminal of the secondary winding 24c.

The common point 30a of resistor 30 and capacitor 32 is connected through a resistor 35 to the grid 27c of thyratron 27. Similarly, the common point 31a between resistor 31 and capacitor 33 is connected through a resistor 36 to the grid 28c of thyratron 28. The capacitative reactance $X_c$ of the capacitors 32 and 33 is chosen relatively small in comparison with the resistance R of resistors 30 and 31. Thus the alternating voltages across the capacitors 32 and 33 lag the voltage of the secondary winding approximately 90 electrical degrees. Since the voltage across the capacitors 32 and 33 are applied to the grids 27c and 28c, the voltages of grids 27c and 28c lag the voltages of the anodes 27a and 28a, respectively, approximately 90 degrees.

The effect of phase shift of the grid voltage is produced by applying a variable component of direct voltage to the grids in addition to the 90-degree lagging alternating voltage component. This is accomplished by means of a pair of electric valves 37 and 38 connected in series relationship across the transformer secondary 24c. The valve 37 is preferably a triode valve and the valve 38 is preferably a diode valve. The circuit is traced from the left hand terminal of the secondary winding 24c to the anode 37a of valve 37, cathode 37b, potentiometer 16, bus 22, armature 6b, through upper contacts 20b of contactor 20 in the closed position thereof to the common cathode connection 34, resistor 39, anode 38a of valve 38, cathode 38b to the opposite terminal of the secondary winding 24c. Thus, the triode valve 27 is in parallel circuit relationship with capacitor 32 and the diode valve 38 is in parallel circuit relationship with capacitor 33.

When the valves 37 and 38 are conducting, charges are placed on the capacitors 32 and 33, and as a result, a component of direct voltage is applied to the grids 27c and 28c. The combination of this direct voltage component with the lagging alternating component produces the effect of phase shift of the grid voltage and corresponding variation of the average current transmitted by the thyratrons.

The amount of phase shift of the grid voltage of the thyratrons, and consequently the amount of current transmitted by the thyratrons, can be varied by varying the relative conductivities of the triode valve 37 and the diode valve 38. This is accomplished simply by varying the conductivity of the triode valve. For this purpose, the cathode 37b of the triode valve is connected to the slider 16a of potentiometer 16, and the control grid 37c is connected to the slider 10a of potentiometer 10.

If the voltage of the grid 37c becomes less negative or increasingly positive with respect to the voltage of the cathode 37b, the conductivity of valve 37 is increased. This has the effect of retarding the phase of the grid voltage of the thyratrons 27 and 28 thereby to decrease the current supplied to the armature 6b of the motor 6. Conversely, if the grid voltage becomes increasingly negative with respect to the cathode voltage, the phase of the thyratron grid voltage is advanced and the current supplied to the armature is correspondingly increased.

With the foregoing understanding of the elements and their organization in the completed system, the operation of the system itself will readily be understood from the following detailed description. It is assumed that the apparatus is in the position in which it is illustrated in the drawing with the lower jaws 2 in their uppermost position. At the lowermost position of the lower jaws 2 during the previous test run, the limit switch 40 which is actuated by the screw 3, closed its contacts to complete an energizing circuit for the operating coil 41a of the field contactor 41. In response to energization, contactor 41 closed its normally open contacts 41b, 41c, and 41d and opened its normally closed contacts 41e and 41f. The opening of contacts 41e and 41f and the closing of contacts 41b and 41c reversed the connections of the field winding 6a to provide for rotation of the motor 6 in a direction to drive the lower jaws 2 toward their uppermost position. The closing of contacts 41d completed a sealing-in circuit for the operating coil 41a of the field contactor 41 in parallel with the contacts of the limit switch 40 so that the contactor remained picked up after the contacts of the limit switch 40 opened in response to the upward movement of the jaws 2.

In the uppermost position of the lower jaws 2, a clutch (not shown) in the testing machine is disengaged to interrupt the driving connection between the motor 6 and the screw 3. Assuming that the motor 6 was stopped with the machine in this position by pressing the stop pushbutton switch 42, it is now necessary to restart the motor 6. This is done by momentarily depressing the start pushbutton switch 43 to close its contacts and thereby complete an energizing circuit for the operating coil 20a of the line contactor 20. In response to energization, the line contactor closes its main contacts 20b and interlock contacts 20c and opens its normally closed dynamic braking contacts 20d. The contacts 20d in opening interrupt the dynamic braking circuit through the dynamic braking resistor 44 in parallel with the armature, and the main contacts 20b in closing complete the connections of the armature to the cathodes 27b and 28b of the thyratrons 27 and 28. The closing of contacts 20c in parallel with the contacts of the start pushbutton switch 43 completes a holding circuit for the operating coil of the line contactor so that the start pushbutton switch 43 may now be released.

With the sliders 10a and 16a of the potentiometers 10 and 16 in the positions in which they are illustrated, the voltage of the grid 37c of the valve 37 is so positive with respect to the voltage of its cathode that the valve is fully conducting. As a result, the grid voltages of the thyratrons 27 and 28 are retarded to such an extent that the thyratrons supply a minimum current to the armature of the motor 6 which therefore rotates at a low creeping speed.

The direction of rotation is such as to drive the lower pair of jaws 2 in an upward direction. However, as pointed out, the lower pair of jaws 2 are in their uppermost position with the clutch between the motor and the screw 3 disengaged so that there is no movement of the jaws at this point in the operation.

The test sample is now firmly secured in the upper and lower jaws 1 and 2. The test run is initiated by shifting the lever 45 to engage the clutch to complete the driving connections between the motor 6 and the screw 3. The shifting of the clutch lever 45 opens contacts 46 to interupt the holding circuit for the operating coil of the field contactor 41. In response to deenergization, the field contactor drops out to open its normally open contacts 41b, 41c, and 41d and to close its normally closed contacts 41e and 41f. Contacts 41d in opening interrupt the holding circuit for the coil 41a so that the contactor 41 cannot be picked up by a subsequent movement of the lever 45.

The lower jaws 2 start downwardly at a very low speed to remove the stretch from the sample. When the stretch is completely removed, the pendulum 9 begins to rotate in a counterclockwise direction thereby to apply load to the test sample. After a very small amount of rotation of the pendulum 9, the contacts of a limit switch 18 actuated by the pendulum 9 are closed to complete an energizing circuit for the operating coil 47a of a relay 47. In response to energization, the relay 47 opens its normally closed contacts 47b and closes its normally open contacts 47c. In closing, the contacts 47c connect the synchronous motor 15 to the source 17 for rotation in a direction to rotate the slider 16a of potentiometer 16 in a counterclockwise direction.

As the slider 16a moves in a counterclockwise direction along the potentiometer 16, it taps off and applies increasingly positive voltages to the cathode 37b of the valve 37. As a result, the conductivity of the valve 37 is decreased and the phase of the grid voltages of the thyratrons 27 and 28 is advanced. The advance in phase of the grid voltages of the thyratrons increases the current supplied to the armature of the motor 6 thereby increasing the speed of the motor 6 and also the downward speed of the jaws 2 driven thereby. The increasing downward speed of the jaws 2 increases the speed of the counterclockwise rotation of the pendulum 9 so that the slider 10a of the potentiometer 10 which is driven by the pendulum begins to overtake the slider 16a of the potentiometer 16 which is driven by the synchronous motor.

When the speeds of the two sliders become equal, there will be no further increase in the speed of the motor 6. This is an indication that the rate of application of load to the test sample, i. e., the rate of increase of load on the test sample, is proportionate to the constant speed of the slider 16a and is therefore uniform.

If, owing to some nonuniformity of the sample or other cause, the rate of application of load to the test sample should tend to decrease, the slider 10a will begin to lag the slider 16a. The result is that the voltage applied to the grid 37c does not increase in a positive direction as rapidly as the voltage applied to the cathode 37b. Consequently, the conductivity of the valve 37 decreases thereby to advance the phase of the grid voltage of the thyratrons 27 and 28 and to increase the speed of the motor 6. On the other hand, if, owing to some nonuniformity in the sample or other cause, the load on the sample increases at a rate faster than that determined by the constant speed of the synchronous motor 15, the slider 10a will lead the slider 16a with the result that the voltage of the grid 37c becomes increasingly positive with respect to the voltage of the cathode 37b. This increases the conductivity of the valve 37 and retards the phase of the grid voltages of the thyratrons 27 and 28 thereby to decrease the speed of the motor 6. Thus, the rate of application of load to the test sample is maintained uniform throughout the test.

At some point in the downward travel of the lower jaws 2, the test sample is ruptured. At the lower end of the downward travel of the jaws 2, the limit switch 40 closes its contacts to complete an energizing circuit for the operating coil 41a of the field contactor 41 which responsively to energization reverses the field connections of the field winding 6a to the source. This reverses the direction of rotation of the motor 6 and causes it to drive the screw 3 and the pair of jaws 2 in an upward direction. This continues until the jaws 2 reach their uppermost position and the clutch in the machine is disengaged to interrupt the driving connections between the motor 6 and the screw 3.

The synchronous motor 15 continues driving the slider 16a until it reaches its limiting position in which the limit switch 19 opens its contacts to disconnect the synchronous motor from the source 17. The pendulum, which is held in its upper position by means of a pawl and ratchet mechanism (not shown) is manually returned by the operator to its initial position. In returning to its initial position, the contacts of the limit switch 18 are opened to deenergize the operating coil 41a of the contactor 47. In response to deenergization, the contactor 47 drops out to open its normally open contacts 47c and close its normally closed contacts 47b. In closing, the contacts 47b complete the connections of the synchronous motor 15 to the source 17 through the contacts of a limit switch 48 and the reverse field winding 15a of the synchronous motor 15. In response to this reverse energization, the motor 15 rotates in the reverse direction to return the slider 16a to its initial position in which the contacts of the limit switch 48 are opened to disconnect the synchronous motor from the source 15. At the beginning of the reverse rotation, the contacts of the limit switch 19 are reclosed thereby leaving the system in a reset condition for a subsequent test.

In the modification illustrated in Fig. 2, the potentiometer 10 of Fig. 1 is replaced by an induction voltage regulator 49. This regulator has a stator coil 49a and an inductively related rotor coil 49b. The stator coil is supplied from a suitable source of alternating voltage which is represented in Fig. 2 by the two supply lines 50. This source may be and preferably is the same as the single phase alternating voltage source 26 of Fig. 1. The rotor member upon which the rotor coil 49b is mounted is mechanically connected by means of a shaft 51, or other suitable coupling means, to the shaft of the testing machine drum 52. The drum 52 corresponds to the drum 8 of the modification of Fig. 1 and carries a pendulum 53 which corresponds to the pendulum 9 of the Fig. 1 modification.

When the axis of the rotor coil 49b is at right angles to the axis of the stator coil 49a, the voltage induced in the rotor coil is zero. For all other positions of the rotor coil, the induced voltage is proportional to the sine of the angle between the axis of the rotor coil and the zero position.

The moment arm of the pendulum 53 about the rotational axis of the drum 52 is proportional to the sine of the angle between the axis of the pendulum and the zero or vertical position thereof. As pointed out in connection with the modification of Fig. 1, the load on the material sample in the testing machine is proportional to the moment arm of the pendulum about its center of rotation. Owing to the mechanical connection between the rotor coil 49b and the drum 52, the rotor coil is rotated through the same angle as that through which the pendulum is rotated. Since the load on the material sample and the voltage induced in the rotor coil are both proportional to the sine of this angle, the induced voltage is thus a measure of the load on the material sample.

This voltage is stepped up by means of a transformer 54 and rectified by suitable means which is illustrated as a bi-phase half wave rectifier valve 55 of which the anodes 55a and 55b are connected to opposite terminals of the secondary winding of the transformer and the twin cathodes 55c and 55d are connected through a potentiometer 56 and a fixed resistor 57 to the center tap of the secondary winding. The potentiometer 56 serves for initially adjusting the rectified voltage across the conductors 58 and 59. The remainder of the modification of Fig. 2 is identical with corresponding parts of the modification of Fig. 1 and consequently it is omitted from the drawing.

In connecting the induction voltage regulator 49 in place of the potentiometer 10 of Fig. 1, the conductor 58 of Fig. 2 is connected to the conductor 60 of Fig. 1 which is connected to the grid 37a of the triode valve 37; and the conductor 59 of Fig. 2 is connected to the conductor 61 of Fig. 1.

The operation of the system of Fig. 2 is identical with the operation of the system of Fig. 1 except that the signal voltage proportional to load on the material sample is supplied by the induction voltage regulator 49 instead of being supplied by the potentiometer 10 of Fig. 1.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. In combination, a material testing machine, an electric motor for driving said machine to apply a load to a material specimen, a reference speed device and means responsive to the difference between the speed of said reference speed device and the rate of application of load to said material specimen for controlling said motor to equalize said rate and said speed.

2. In combination, a material testing machine, an electric motor for driving said machine to apply a load to a material specimen, a reference speed device, means for producing a control voltage having a predetermined relationship to the difference between the speed of said reference speed device and rate of application of load to said material specimen, and electric valve means responsive to said voltage for controlling said motor to equalize said rate and said speed.

3. In combination, a material testing machine, an electric motor for driving said machine to apply a load to a material specimen, a synchronous motor, means responsive to the difference between the speed of said synchronous motor and the rate of application of load to said material specimen for producing a control voltage, and electric valve means responsive to said voltage for controlling said motor to equalize said rate and said speed.

4. In combination, a material testing machine, an electric motor for driving said machine to apply a load to a material specimen, a synchronous motor, means for producing a control voltage having a predetermined relationship to the difference between the speed of said synchronous motor and the rate of application of load to said material specimen comprising a potentiometer having its slider connected to be driven by said synchronous motor and a second potentiometer having its slider connected to be driven by said machine at a speed proportional to the rate of application of load to said specimen, and electric valve apparatus responsive to said voltage for controlling said motor to equalize the speeds of said sliders.

5. In combination, a material testing machine having a pair of members for holding a material specimen, an electric motor connected to drive one of said members, a pivotally mounted pendulum connected to the other of said members to provide for increasingly loading said specimen in response to movement of said motor driven member, a synchronous motor, a first member driven by said synchronous motor at a constant speed, a second member driven in response to movement of said pendulum at a speed proportional to the speed of said pendulum, means for producing a control voltage having a predetermined relationship to the difference between the speed of said first member and the speed of said second member, and electric valve apparatus responsive to said control voltage for controlling said motor to equalize the speeds of said first and second members thereby to cause load to be applied to said specimen at a constant rate.

6. In combination, a material testing machine having a pair of members for holding a material specimen, an electric motor connected to drive one of said members, a pivotally mounted pendulum connected to the other of said members to provide for increasing the load on said specimen in response to movement of said motor driven member, means for producing a control voltage having a predetermined relationship to the difference between the rate of increasing the load on said specimen and a constant rate comprising a synchronous motor, a potentiometer having its slider connected to be driven by said synchronous motor and a second potentiometer having its slider connected to be driven in response to movement of said pendulum, and electric valve means responsive to said control voltage for controlling said first mentioned motor to equalize the speeds of said sliders thereby to effect the application of load to said specimen at a constant rate.

7. In combination, a material testing machine having a pair of members for holding a material specimen, an electric motor connected to drive one of said members, a pivotally mounted pendulum connected to the other of said members to provide for increasing the load on said specimen in response to movement of said motor driven member, means for producing a control voltage having a predetermined relationship to the difference between the rate of increasing the load on said specimen at a constant rate comprising a synchronous motor, a source of substantially constant control voltage, a potentiometer having its slider connected to be driven by said synchronous motor and a second potentiometer having its slider connected to be driven in response to movement of said pendulum, and an electric valve provided with an anode, a cathode connected to one of said sliders and a grid connected to the other of said sliders for controlling the supply of current to said first motor to equalize the speeds of said sliders thereby to effect application of load to said specimen at a constant rate.

8. In combination, a material testing machine, an electric motor for driving said machine to apply a load to a material specimen, electrical means for producing a reference voltage varying substantially linearly with time, means responsive to application of load to said material specimen for producing a signal control voltage substantially proportional to the load on said material specimen, and electric valve means responsive to the difference of said voltages for controlling said motor to equalize the rates of variation of said voltages thereby to effect application of load to said specimen at a constant rate.

9. In combination, a material testing machine, an electric motor for driving said machine to apply a load to a material specimen, means for producing a reference voltage having a substantially constant rate of variation, an induction voltage regulator responsive to application of load to said specimen for producing a signal control voltage proportional to said load, and means responsive to the difference of said voltages for controlling said motor to equalize the rates of variation of said voltages thereby to effect application of load to said specimen at a constant rate.

10. In combination, a material testing machine, an electric motor for driving said machine to apply a load to a material specimen, means for producing a reference voltage having a substantially constant rate of variation, means for producing a signal voltage proportional to the load on said material specimen, and means responsive to the difference of said voltages for controlling the motor to equalize the rates of variation of said voltages thereby to effect application of load to said material specimen at a constant rate.

11. In combination, a material testing machine, an electric motor for driving said machine to apply a load to a material specimen, an electrical device for producing a reference voltage having a substantially constant rate of variation, means responsive to the application of load to said material specimen for producing a signal control voltage having a rate of variation proportional to the rate of application of load to said material specimen and means responsive to the difference of such voltages for controlling said motor to equalize the rates of variation of said voltage thereby to effect application of load to said specimen at a constant rate.

12. In combination, a material testing machine having a pair of members for holding a material specimen, an electric motor connected to drive one of said members, a pivotally mounted pendulum connected to the other of said members to provide for increasingly loading said specimen in response to movement of said motor driven member, means for producing a reference voltage having a substantially constant rate of variation, an induction voltage regulator driven by said pendulum for producing a signal control voltage proportional to the load on said material specimen, and electric valve means responsive to the difference of said voltages for controlling said motor to equalize the rates of variation of said voltages thereby to effect application of load to said specimen at a constant rate.

13. In combination, a material testing machine having a pair of members for holding a material specimen, an electric motor connected to drive one of said members, a pivotally mounted pendulum connected to the other of said members to provide for increasingly loading said specimen in response to movement of said motor driven member, electrical means for producing a direct reference voltage having a substantially constant rate of variation, an induction voltage regulator driven by said pendulum for producing an alternating voltage having an effective value proportional to the load on said specimen, means for rectifying said alternating voltage to produce a direct signal control voltage proportional to said load, and electric valve means responsive to the difference of said reference voltage and signal voltage for controlling said motor to equalize the rates of variation of said reference voltage and said signal voltage thereby to effect application of load to said specimen at a substantially constant rate.

14. Control apparatus for a material testing machine comprising an electric motor for applying a load to a material specimen, a source of reference voltage corresponding to a predetermined rate of application of load to said material specimen, means for producing a signal voltage corresponding to the rate of application of load to said specimen by said motor, and means responsive to the difference of said voltages for controlling said motor to equalize said rates.

15. Control apparatus for a material testing machine comprising an electric motor for applying a load to a material specimen, a source of reference voltage, means for producing a signal voltage corresponding to the rate of application of load to said specimen, and electric valve means responsive to the difference of said voltages for controlling said motor to maintain the rate of application of load to said specimen constant.

16. Control apparatus for a material testing machine comprising an electric motor for applying a load to a material specimen, a source of reference voltage corresponding to a predetermined rate of application of load to said specimen, means comprising an induction voltage regulator responsive to the load applied to said specimen for producing a signal voltage corresponding to the rate of application of load to said specimen and electric valve means responsive to the difference of said voltages for controlling said motor to effect application of load to said specimen at said predetermined rate.

CHARLES E. MILLER.
ROBERT J. DEMARTINI.